(12) United States Patent
Bergan

(10) Patent No.: US 9,541,070 B2
(45) Date of Patent: Jan. 10, 2017

(54) PLANT FOR ENERGY PRODUCTION

(71) Applicant: NEST AS, Billingstad (NO)

(72) Inventor: Pål Bergan, Nesøya (NO)

(73) Assignee: NEST AS, Billingstad (NO)

( * ) Notice: Subject to any disclaimer, the term of this patent is extended or adjusted under 35 U.S.C. 154(b) by 30 days.

(21) Appl. No.: 14/410,805

(22) PCT Filed: Jun. 27, 2013

(86) PCT No.: PCT/NO2013/050120
§ 371 (c)(1),
(2) Date: Dec. 23, 2014

(87) PCT Pub. No.: WO2014/003577
PCT Pub. Date: Jan. 3, 2014

(65) Prior Publication Data
US 2015/0167648 A1    Jun. 18, 2015

(30) Foreign Application Priority Data
Jun. 28, 2012  (NO) .................................. 20120750

(51) Int. Cl.
*F03G 6/06* (2006.01)
*F24J 2/34* (2006.01)
(Continued)

(52) U.S. Cl.
CPC ................. *F03G 6/06* (2013.01); *F03G 6/065* (2013.01); *F03G 6/067* (2013.01); *F03G 7/04* (2013.01);
(Continued)

(58) Field of Classification Search
USPC .................................... 60/641.15, 641.8, 659
See application file for complete search history.

(56) References Cited

U.S. PATENT DOCUMENTS 2,109,926 A   3/1938  Nelson
3,470,943 A   10/1969 Van Huisen
(Continued)

FOREIGN PATENT DOCUMENTS

CN   102162703 A   8/2011
DE   10211598 A1   9/2002
(Continued)

OTHER PUBLICATIONS

Bråten, Knut, "International Search Report" for PCT/NO2013/050120, as mailed Sep. 24, 2013.

*Primary Examiner* — Hoang Nguyen
(74) *Attorney, Agent, or Firm* — Winstead PC

(57) ABSTRACT

The invention provides a plant for production of energy, comprising any type of heat or energy source including but not limited to solar power sources, nuclear reactors, fossil fuel plants, wind power plants, tidal power plants, waste heat power plants and geothermal sources, operatively arranged at an input side of the plant, and heat delivery or energy production means such as turbine-electric generator sets, operatively arranged at a delivery side of the plant. The plant is distinctive in that it further comprises a thermal energy storage with integrated heat exchanger, comprising a solid state thermal storage material, a heat transfer fluid and means for energy input and output, wherein: the storage comprises at least one heat transfer container, solid state thermal storage material is arranged around the heat transfer container, the heat transfer container contains the heat transfer fluid and the means for energy input and output, so that all heat transferring convection and conduction by the heat transfer fluid takes place within the respective heat transfer container, the thermal energy storage with heat exchanger has been arranged inside thermal insulation, and the solid state thermal energy storage with heat exchanger, has been arranged between the input side and delivery side of the plant for storage and heat exchange of thermal energy, the (Continued)

Figure 1:
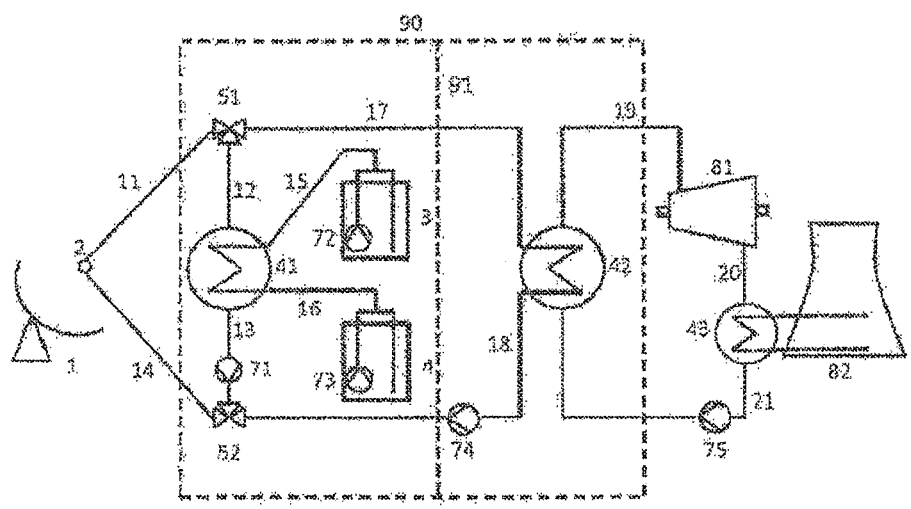

storage is coupled directly or via an additional heat exchanger to the source and the storage is coupled directly or via an additional heat exchanger to the delivery side of the plant.

6 Claims, 12 Drawing Sheets

(51) Int. Cl.
    *F24J 2/06*     (2006.01)
    *F28D 20/00*     (2006.01)
    *F03G 7/04*     (2006.01)

(52) U.S. Cl.
    CPC .. *F24J 2/06* (2013.01); *F24J 2/34* (2013.01); *F28D 20/0056* (2013.01); *F28D 2020/0065* (2013.01); *Y02E 10/10* (2013.01); *Y02E 10/44* (2013.01); *Y02E 10/46* (2013.01); *Y02E 60/142* (2013.01); *Y02E 70/30* (2013.01)

(56) References Cited

U.S. PATENT DOCUMENTS

| | | | |
|---|---|---|---|
| 5,694,515 | A | 12/1997 | Goswami et al. |
| 6,789,608 | B1 | 9/2004 | Wiggs |
| 2008/0250788 | A1* | 10/2008 | Nuel ...................... F03G 6/068 60/641.14 |
| 2010/0307734 | A1 | 12/2010 | Wildig et al. |
| 2011/0100586 | A1* | 5/2011 | Yang ................... F28D 20/0052 165/45 |

FOREIGN PATENT DOCUMENTS

| | | | | |
|---|---|---|---|---|
| DE | 102009036550 | A1 | 5/2010 | |
| DE | EP 2204618 | A2 * | 7/2010 | ......... F28D 20/0039 |
| EP | 2204618 | A2 | 7/2010 | |
| NO | 332707 | B1 | 12/2012 | |
| WO | WO-2012169900 | A1 | 12/2012 | |

* cited by examiner

PLANT FOR ENERGY PRODUCTION

FIELD OF THE INVENTION

The present invention relates to plants for production of energy from sources like solar power, particularly concentrated solar power (CSP) plants, but also from other thermal energy sources including but not limited to nuclear reactors, fossil fuel plants and deep earth geothermal sources. More specifically, the invention relates to modification of existing plant designs or for building simpler and more effective new plants.

BACKGROUND OF THE INVENTION AND PRIOR ART

Significant research and development efforts are being made on an international scale to improve the efficiency and environmental performance for energy producing systems. Today about half of all such efforts are made within the renewable energy sector rather than for traditional fossil or nuclear fuel type thermal power production. It has become clear that energy storage will be a key technology for making further advances, and large investments are currently being made in developing such capabilities, notably by storing energy using rechargeable batteries, pumped hydro storage, compressed air, flywheels, conversion to hydrogen, and heat storage including heat storage with material phase change.

It is generally recognized that energy storage can facilitate time dependent adaptation of power delivery to consumers and the market in general, and it can provide security of delivery by way of bridging power delivery when the primary power production is insufficient or it fails.

For some types of renewable energy production having storage is absolutely necessary. One such field is concentrated solar power (CSP) where heat storage is used to compensate for insufficient or failing heat production, such as during day time when cloud cover occurs and during the night hours when there is no sun. In the case of CSP using parabolic trough collectors the heat is generated by reflected and focused sun rays heating oil in a pipe system; this oil is thereafter heat exchanged with molten salt which is stored in large, insulated storage tanks. The oil is a feasible mineral, organic or synthetic heat transfer oil, such as Therminol. When stored heat is needed for supplementary or extended energy production it is extracted by a reverse heat exchange between molten salt and oil. Thereafter the oil is once more heat exchanged into water-steam which in turn is used to produce electricity via turbines and electric generators. This technology has some severe disadvantages in that it involves using very expensive storage fluids such as molten salt, it requires multiple oil/salt heat exchangers, it needs at least two large molten salt storage tanks, it requires molten salt pumps and corresponding pumping energy to move the molten salt to and from the tanks, and there is a risk of the salt solidifying in pipes or other structures which can occur even at very high temperature.

Another version of CSP is where a large field of mirrors (heliostats) reflects sun rays onto a high tower where a receiver filled with a high temperature working fluid, such as molten salt, is used for photon-heat conversion. In the case of using molten salt as working fluid this fluid may be directly heat exchanged with water-steam to generate electric power using turbines and generators. Alternatively, the molten salt may be stored in large tanks for later to be used to generate electricity as explained above.

Recent research efforts also consider using steam as working fluid for the CSP tower technology; in this way heat exchangers from molten salt to steam may be avoided. The problem with direct steam technology is to be able to store the heat for delayed use, particularly combined with producing electricity effectively. The current invention provides a possible solution to this problem.

There are numerous traditional technologies where the main source of energy is heat and pressure; such as fossil fuel (coal, oil, gas) plants and nuclear power plants. Although such plants may not depend on having storage for periodical lack of energy production, heat storage may be a great advantage and economically profitable for such plants as well. For instance, heat storage may facilitate full use or better use of the heat production capability throughout a 24 hour day cycle since heat produced during the night may be fully or partly stored and provide higher energy production during the day time in accordance with market demands. Moreover, storage is of great value for providing continuity and security of energy supply or for dealing with temporal bottlenecks in the electric grid system.

The objective of the present invention is to provide a plant for production of energy, which plant is beneficial over the previous technology with respect to issues mentioned. Further, the plant storage should preferably:

- Be able to simplify the overall process of heat accumulation, transportation and storage as compared with existing systems
- Be able to operate with temperatures and pressures most suitable for the heat collection and transportation of heat to the storage
- Be able to accommodate different types of working fluid deemed most suitable for the above mentioned operation
- Be able to efficiently transport heat out of storage by way of fluids with temperature and pressure suitable for the heat extraction process
- Be able to accommodate types of working fluids most suitable for the heat delivery from storage
- Be able to operate in a primarily heat exchanger mode where the heat in the working fluid of the primary heat input pipe loop is heat exchanged directly and simultaneously within the storage heat exchangers with another type of working fluid in the heat extraction pipe system
- Be suitable for implementation with already commercially available components such as pumps, valves, pipes, sensors, and control systems
- Provide cost and efficiency advantages over existing systems
- Be environmentally safe
- Be easy to integrate within and modify existing facilities as well as for being used in design and operation of new facilities

SUMMARY OF THE INVENTION

The invention provides a plant for production of energy, comprising any type of heat or energy source including but not limited to solar power sources, nuclear reactors, fossil fuel plants, wind power plants, tidal power plants, waste heat power plants and geothermal sources, operatively arranged at an input side of the plant, and heat delivery or energy production means such as turbine-electric generator sets, operatively arranged at a delivery side of the plant. The plant is distinctive in that the plant further comprises a thermal energy storage with integrated heat exchanger, comprising a solid state thermal storage material, a heat transfer fluid and means for energy input and output, wherein:

the storage comprises at least one heat transfer container, solid state thermal storage material is arranged around the heat transfer container, the heat transfer container contains the heat transfer fluid and the means for energy input and output, so that all heat transferring convection and conduction by the heat transfer fluid takes place within the respective heat transfer container, the thermal energy storage with heat exchanger has been arranged inside thermal insulation, and the solid state thermal energy storage with heat exchanger, has been arranged between the input side and delivery side of the plant for storage and heat exchange of thermal energy, the storage is coupled directly or via an additional heat exchanger to the source and the storage is coupled directly or via an additional heat exchanger to the delivery side of the plant.

The term coupled directly in this context means that the working fluid in the source or the delivery side is the same as that in the storage and the systems are coupled merely via piping, valves, pumps or compressors, without additional heat exchangers or storages.

Preferable embodiments of the plant are defined in the dependent claims, to which reference is made.

The thermal energy storage and heat exchanger is termed a NEST thermal energy storage with heat exchanger.

Most preferably, the NEST thermal energy storage and heat exchanger comprises one or more heat transfer containers arranged vertically standing side by side, inside an outer container or pipe section, the space between the one or more heat transfer containers and the outer container or pipe section has been filled with concrete or other solid state materials. No traditional armouring bars or structures will be required, facilitating the production of the heat storage of the plant. By arranging many cylindrical outer containers or pipe section vertically standing side by side, each filled with concrete and one or more heat transfer containers as described above, and coupling the heat transfer container means for heat input and output together and to sources and the delivery side as described and illustrated below, large plants can be provided surprisingly easy. The pipe in pipe, or container in container solution as mentioned above, with concrete between the heat transfer containers(s) and the outer pipe or container, provides effective basic units or heat cells for heat storage of a plant of the invention. Connecting pairs of heat transfer containers at the bottom, thereby enabling the working fluid to flow from one to the other, with concrete between the heat transfer containers and the outer pipe or container, provides another effective basic unit or heat cell for heat storage of a plant of the invention. In another preferred embodiment the solid state material of the heat cells of the heat storage comprises grouting and concrete, the grouting is arranged between the concrete and the heat transfer containers. The storage, comprising many basic cells or units, comprises insulation around the storage, preventing heat exchange with and heat loss to the ground or the air.

Please refer to U.S. Pat. No. 332,707 or patent application PCT/NO2012/050088, herein incorporated by reference, for a detailed description of the NEST solid state thermal storage per se and particularly the preferred embodiments thereof, some of which are used in the plants of the invention.

The present invention is beneficial with respect to all of the above mentioned issues, as will be clear from the further description and accompanying figures.

The primary heat input system is in the most typical case a closed loop of pipes filled with working fluid where cold fluid is pumped through the heat generating system where it is heated by some energy source and thereafter transported into the storage where heat is delivered and, hence, the temperature and pressure of the fluid will decrease. In the case of concentrated solar power (CSP) heating comes from sun light (photon radiation) being reflected onto a receiver filled with circulating working fluid. A main type of sun energy receiver is parabolic troughs in which parabolic reflectors (mirrors) reflect sun light onto a pipe receiver in the focal point in which the working fluid flows and is heated. Another type is heliostat field reflectors (mirrors) reflecting sun light onto a tower with a receiver field on top through which the working fluid is circulated and heated. Other types are parabolic dish systems where the sun rays are reflected and focused onto a local receiver attached to the movable mirror and within the receiver the working fluid is being heated. Yet another type of CSP system under development is based on Fresnel collectors. For some solar heating systems it can be beneficial to operate with a lower temperature of the incoming working fluid and thereby achieve better energy absorption and overall efficiency. In current CSP systems the working fluid in the primary system is typically thermal oil that is heat exchanged with molten salt in a separate heat exchanger before being stored as molten salt in large tanks. Alternatively, as in CSP tower technology, the primary working fluid may be molten salt that can go directly into tanks for heat storage.

A drawback by current molten salt storage systems is that the temperature of the working fluids in the heat transporting systems exiting the heat exchanger has to be safely higher than the solidification temperature of the molten salt, typically more than 260 degrees C. for the binary nitrate salt mix used today, often referred to as Solar Salt. This severely limits the use of molten salt as heat storage in applications with low or moderate temperature levels. Other salt mixes may provide a lower temperature limit than Solar Salt. If the working fluid is oil the maximum and minimum temperatures in this fluid will roughly speaking have to be in the range between 400 (boiling of oil) and 300 degrees C. (solidification of molten salt). The fact that the dynamic temperature range can only be about 100 degrees for such systems greatly reduces their efficiency. According to the current invention the heat storage is mainly of solid type and the heat exchange takes place in the heat exchangers that are integrated within the storage itself. This implies that there will be no lower limit for temperature in the storage other than what is acceptable for the working fluids themselves.

This not only implies a potential for better utilization of the storage itself due to higher dynamic storage temperatures, but may also increase efficiency of the solar energy absorption system.

Some simple type solar heating systems are only used for heating water and cannot be used to produce electricity. However, CSP systems are currently being developed that can generate high pressurize steam that can be used directly for running turbines. In particular a target is to develop systems that generate supercritical fluid where there is no distinct difference between water and steam. For instance, by operating with temperatures in the range 550° to 600° C. or higher under supercritical pressure one may achieve much improved turbine efficiency compared with steam turbines operating at subcritical pressure. For CSP use of storage is a key technology to compensate for variable solar energy influx depending on time and variable cloud cover and no heating during dark hours, and also for efficiency. Also in this setting the current invention offers a good and efficient solution to the storage problem. When heat should be stored the pressurized steam is fully or partly transferred to the storage which, by way of its heat exchangers, transfers the heat to the solid storage material. When pressurized steam is wanted for the turbines heat is simply taken from the storage by way of steam using the same heat exchangers and directed into the turbine loop.

There are many other types of sources of heat that can be dealt with in a similar way. One such setting is pressurized steam from geothermal reservoirs or from active geothermal or upwelling mantle zones. Typically geothermal installations produce heat by the same rate during night and day. By storing heat during the night and by tapping this heat from the storage during the day one will be able to increase the power production during the peak hours of the day far beyond what comes from the constant flow of steam from the geothermal reservoir. Implementation of this concept, which is a typical feature of embodiments of the invention, of course requires additional turbine capacity to increase the power production. Fossil fuel plants, nuclear plants and waste heat power plants are other possible sources delivering heat energy to a plant of the invention. Use of waste heat from the industry is yet another example. Wind power plants, tidal power plants, and silicon wafer based solar power plants are examples of sources delivering electricity to a plant of the invention. Sources delivering electricity require either an external heating element that uses electricity to heat the working fluid before it enters the storage, or heating elements integrated in the heat exchangers, as the means for heat input in the heat storage of the plant, for converting electricity to heat.

Previously mentioned solid storage invention also describes how electricity may be used as heat source by way of Joule type electric heating elements that are directly inserted into the heat exchanger containers. Please refer to patent application PCT/NO2012/050088, for a detailed description of the solid state thermal storage per se.

A key trait of the current invention is its flexibility with regard to adaptation to different types of working fluids or heat transfer fluids. For instance, the storage heating loop may be based on thermal oil and the heat extraction for turbine loop may be based on water-steam. Another alternative is that the storage heating loop is based on water to steam and also the heat extraction loop from storage is based on from water to steam. These concepts will be explained in further detail later. It is to be noted that the current invention can work with steam under very high pressures, such as supercritical steam, because the steam goes in adequately dimensioned pipes that can sustain such conditions and that such expanding pipes do not represent any problem for the type of solid storage which is a part of the plant of the invention.

The current invention may also be used with working fluids other than oil and water-steam. Other fluids include, but are not limited to, sub-saturated or saturated water, molten salt, synthetic molten salts, liquid metals and alloys, various types of composite fluids, particles suspended in fluids, gases, etc.

The innovation may have many other forms and usages as well. For instance it can be implemented to complement or replace salt storage in already existing CSP plants with salt storage. In such case the working fluid for heat storage as well as the working fluid for heat extraction from the storage will typically be oil. As will be shown in later this situation may well be dealt with by the current invention.

A special form of usage of the invention is when it is operated as primarily a heat exchanger from one type of working fluid to another type of working fluid rather than being used in heat storage or heat extraction modes. The most typical situation may be when hot oil from the primary heating loop is heat exchanged directly with water to steam within the heat exchangers of the storage. This application may be of value for CSP installations when operating during the day. The purpose of this concept is that one may be able to fully avoid having a separate heat exchanger (boiler) for going from heated oil to steam and thereby achieve considerable cost savings. Truly, some heat will leak into the solid state storage when the storage heat is being operated primarily in a heat exchanger mode; however, such heat is not lost but will rather be available for later use when the storage is being operated in a heat extraction mode.

FIGURES

Figure 2:
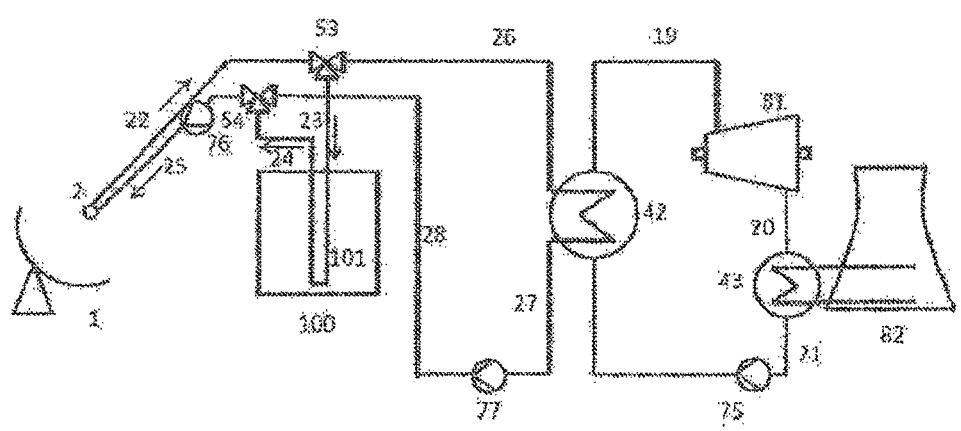
Figure 3:
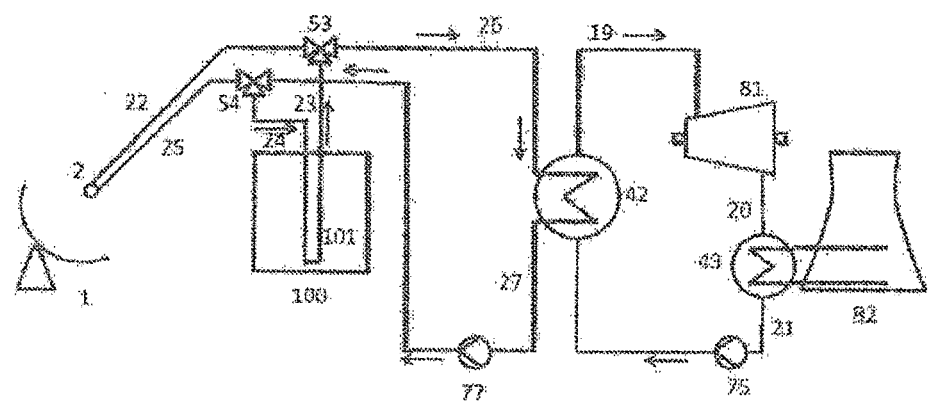
Figure 4:
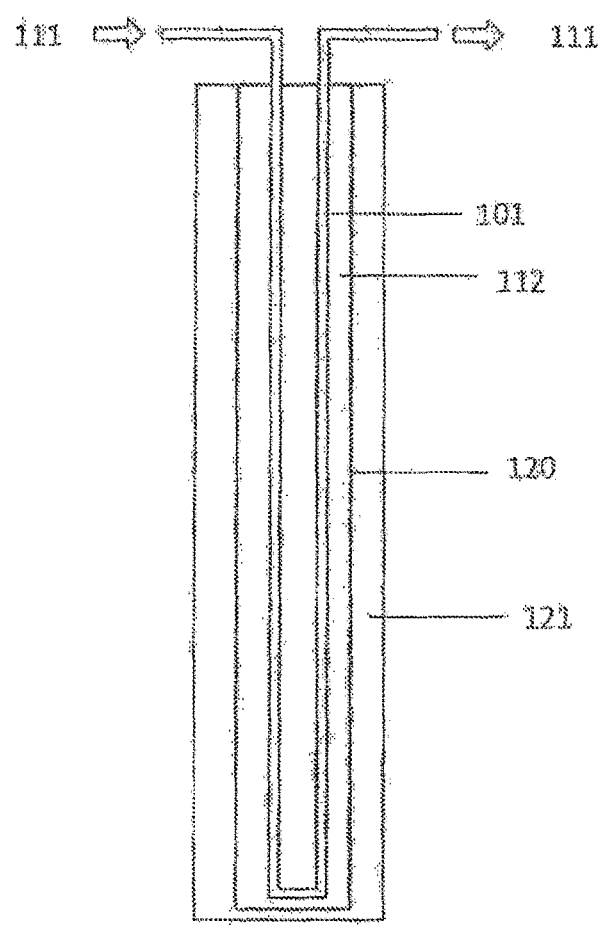

The invention is illustrated by 10 figures, of which:

FIG. 1 shows a process diagram which illustrates a prior art typical CSP installation with salt storage or similar, and illustrates which parts thereof can be replaced and improved by the current invention FIG. 2 shows a process diagram for a plant of the invention, wherein the heat storing mode of a CSP installation or similar where the molten salt storage has been replaced with a solid state storage of the current invention and where the same working fluid is used from heat storage as for heat extraction FIG. 3 shows a process diagram for the heat extraction mode of a CSP installation or similar of the invention, where the molten salt storage has been replaced with a solid state storage and where the same working fluid is used from heat storage as for heat extraction for subsequent energy use FIG. 4 shows a heat exchanger for the solid state storage where the same working fluid is used for heat storage as for heat extraction from the storage. This version also has an alternative and simpler design which will be found in the detailed description.

Figure 5:
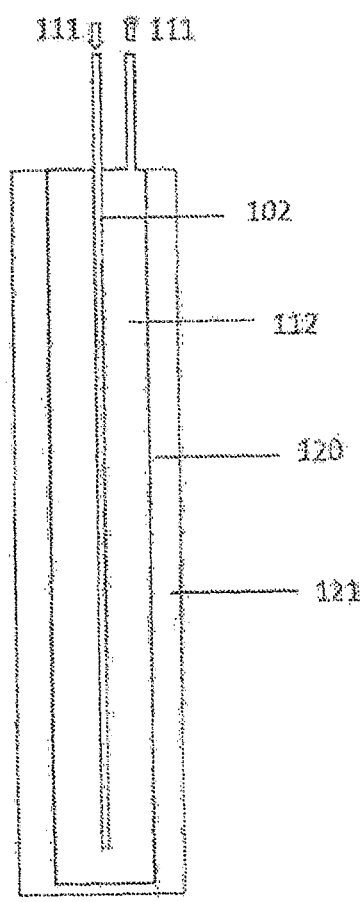
Figure 6:
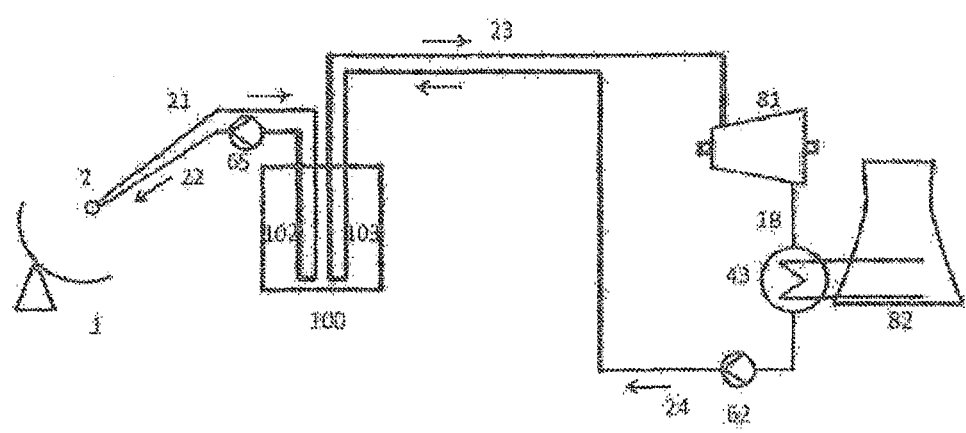
Figure 7:
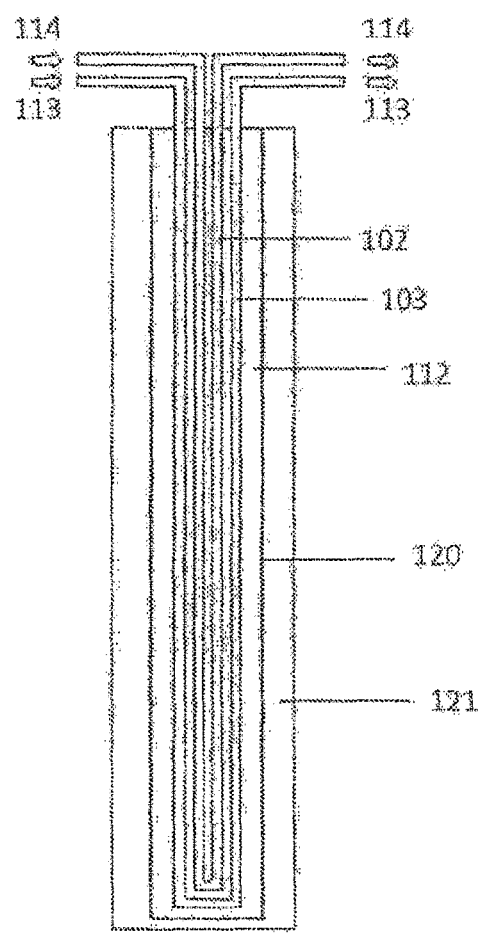
Figure 8:
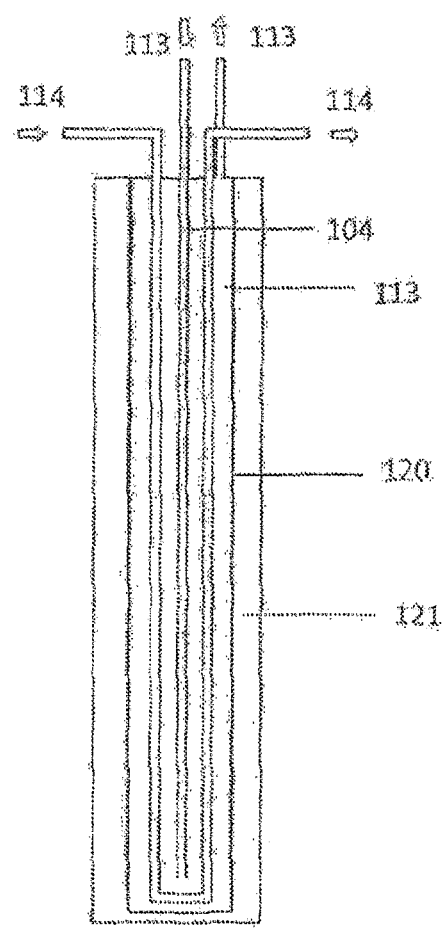
Figure 9:
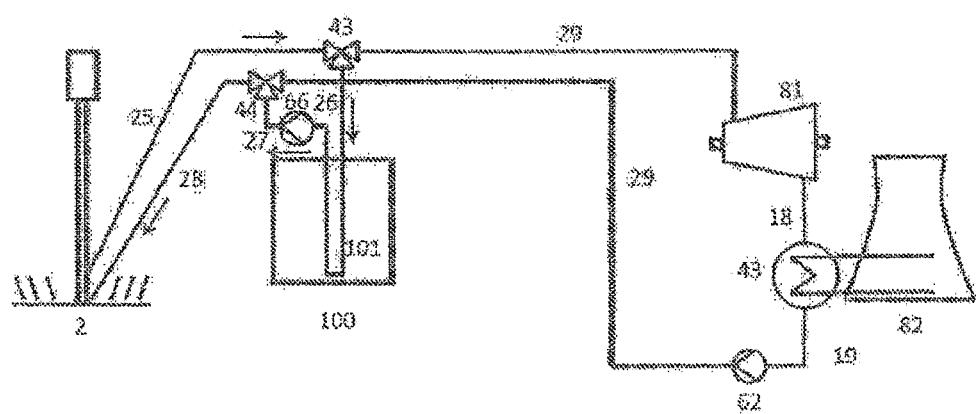
Figure 10:
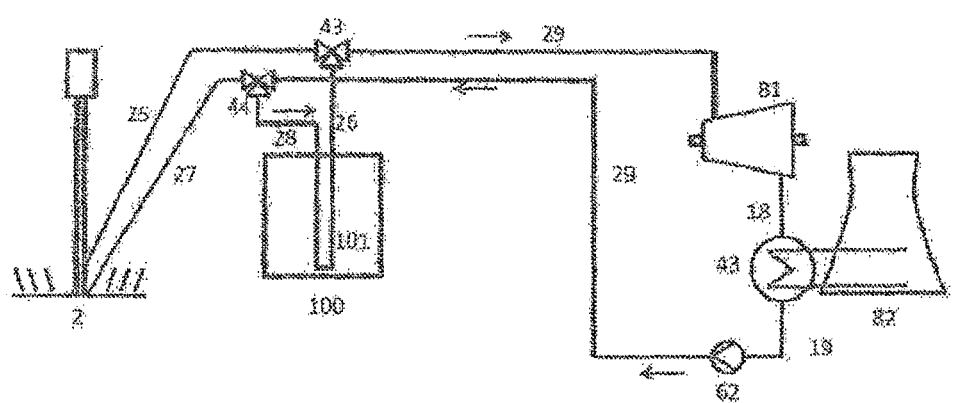

FIG. 5 shows a heat exchanger for the solid state storage where the same working fluid is used for heat storage as for heat extraction from the storage and where the heat exchange fluid within the storage heat exchangers are also of the same type FIG. 6 shows a process diagram for the heat storage mode as well as for the heat extraction mode of a CSP installation or similar of the invention where one type of working fluid is used for heat storage into the solid state storage and another type of working fluid such as water-steam is used for the heat extraction and subsequent energy use FIG. 7 shows a heat exchanger for the solid state storage where one type of working fluid is used for heat storage and another type of working fluid is used for heat extraction from the storage FIG. 8 shows a heat exchanger for the solid state storage where one type of working fluid is used for heat storage as well as for the heat exchanger fluid in the solid state storage and another type of working fluid is used for heat extraction from the storage FIG. 9 shows a process diagram for the heat storing mode of a CSP installation or similar plant of the invention, where the heat generating unit produces steam which is used directly to carry heat to the solid state storage FIG. 10 shows a process diagram for the heat extraction mode of a CSP installation or similar plant of the invention, where the heat generating unit produces steam which is used directly to carry heat to the solid state storage and where water-steam is also used for the heat extraction and subsequent energy use.

FIGS. 11-14 illustrate embodiments of the previously mentioned pipe in pipe solution, for which the at least one heat transfer container is the inner pipe and the volume between the heat transfer container, sometimes termed heat pipe, has been filled with concrete.

DETAILED DESCRIPTION

FIG. 1 illustrates one type of target application of the invention; this figure shows a schematic process diagram for a prior art parabolic, trough type, concentrated solar power installation not according to the invention. A purpose of this figure is to illustrate the complexity of such conventional CSP plants and to show how the system can be greatly simplified and major parts of the system can be replaced by the current invention. In heat storing mode trough type parabolic mirrors 1 heat up oil in receiver 2 through which oil is pumped into pipe 11 into a valve 51 and from there into pipe 12, after which the oil goes into a heat exchanger 41 to deliver heat, after this the cooled oil is pumped by pump 71 through pipes 13 and 14 back into the trough heat absorber 2 for renewed heating. This pipe loop represents the primary heating loop; the working fluid in such a loop is typically thermal oil that can sustain high temperature whereas other working fluids may also be considered. The heat provided by the primary loop is heat exchanged with molten salt which is sent from a "cold" storage tank 4 by way of pump 73 through pipe 16, heat exchanger 41 and pipe 15 into a "hot" molten salt tank 3.

Later, during heat extraction mode, hot molten salt is sent from tank 3 by way of pump 72 through pipe 15, heat exchanger 41 and pipe 16 back into the cold storage tank 4. During this heat delivery process oil is circulated and heated by the molten salt in the heat exchanger 41 and sent via pipe 12, valve 51 and pipe 17 into another heat exchanger 42. After delivering heat in heat exchanger 42 the oil is by pump 74 pumped back through pipe 18, valve 52, and pipe 13 back into the heat exchanger 41 for renewed heating of the thermal oil in this pipe loop.

Water under high pressure is heated and converted to steam in heat exchanger (boiler) 42 and goes through pipe 19 into turbine-generator system 81 for generation of electricity and further through pipe 20 into a cooling exchanger system (condenser) 43 utilizing a cooling tower 82 or other cooling system, after which the recycled turbine cycle water (feedwater) is pumped to high pressure by pump 75 via pipe 21 back into heat exchanger 42 to complete the cycle.

It seems clear that the system described in FIG. 1 is rather complicated and it is also very expensive. Molten salt has very good heat storing capacity, but molten salt suitable for such applications is also very expensive. A serious drawback is also that molten salt cannot be used in lower temperature systems as the salt will solidify.

The system diagram FIG. 1 further shows an area that is defined by a dotted line 90 and a dotted line 91. The current invention can in principle replace all the components inside dotted line 90, apart from pump 74, and in general replace all components within dotted line 91; in both cases achieving a much simpler and more cost efficient plant or system.

FIG. 2 shows a system flow diagram for one type of implementation of the plant of the current invention, with simplifications compared with frame 91 in FIG. 1. What is shown in this figure represents a modification of what is shown in FIG. 1 with the difference that the salt storage tanks and the oil/salt heat exchangers are replaced by a solid state storage of the type associated with the invention. To clarify matters FIG. 2 indicates the oil flow only for the primary loop during heat storing operation. Oil is heated in solar heater 2 and sent via pipe 22 and valve 53 into solid state storage 100 with heat exchangers 101 where it delivers heat and is cooled down. It is thereafter sent via pipe 24, valve 54, pipe 25 and pump 76 back into the solar heating system.

FIG. 3 shows the same system as in FIG. 2 when it is operating in a heat extraction mode. Cooled oil is sent through the solid state heat storage and the heat exchangers 101 and further on via pipe 23, valve 53, and pipe 26 into heat exchanger (boiler) 42 where it is cooled and sent back to the storage via pipe 27, pump 77, valve 54 and pipe 24 back into the storage for reheating. What takes place in the boiler and the turbine loop 19, 81, 20, 43, 21 and 75 is in principle exactly the same as has been explained for salt storage technology in connection with FIG. 1.

By comparing the system in FIGS. 2 and 3 with the salt storage base case it is seen that the heat exchanger between oil and salt is no longer necessary, and the two large tanks for molten salt has been replaced with one solid state storage. Equally important, the lower storage operational temperature associated with risk for solidification of the molten salt is no longer applicable. This means that the oil working fluid, as well as the solid state storage, can operate with a much higher dynamic temperature range and/or at lower temperatures, simply because the lower temperature bound imposed by the molten salt is no longer there. This can also have positive implications for the efficiency of the solar energy catching system 1 and 2.

Figures 13, 14:
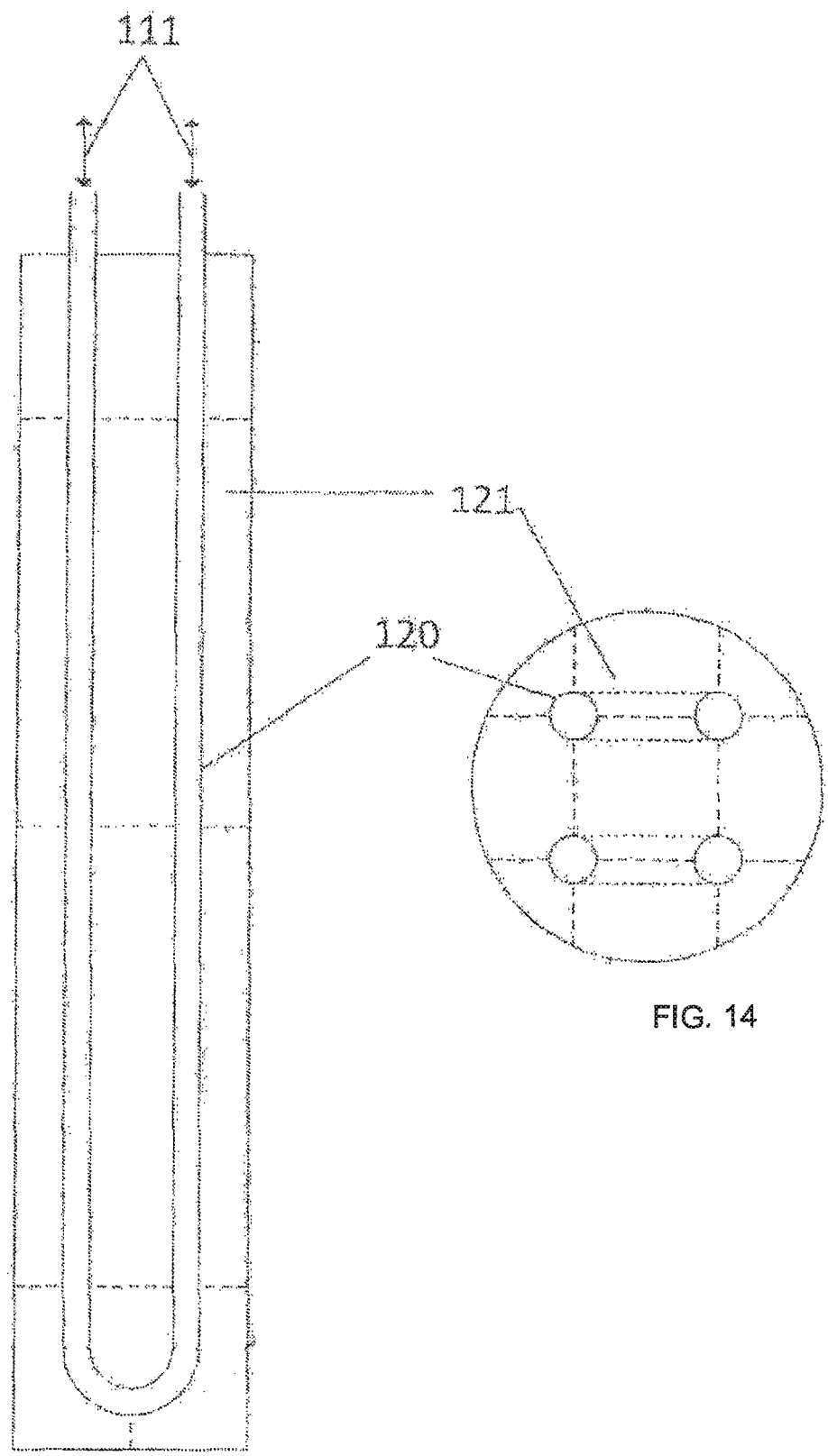

The fact is that the same type of working fluid is used for delivery of heat to the solid state storage as for extracting heat from it. In such case the heat exchangers of current type can be rather simple. FIG. 4 shows a pipe loop within a storage stack in accordance with one of the embodiments of patent PCT/NO2012/050088. For a detailed description of the solid state thermal storage per se, please refer to said patent applications. The working fluid 111 goes in a pipe 101 in a loop inside a vertical heat exchanger container 120 filled with heat transfer fluid 112. Next to the heat exchange container 120 and in full contact with the container there are solid state heat storage materials 121, illustrated out of scale for clarity, which can be composed of zones with different material properties. In heat storage mode the working fluid is warmer than the heat exchange or transfer fluid 112 which in turn is warmer than the solid state heat storage material 121. In the heat extraction mode the temperature situation is the opposite. Note that the working fluid 111 may have high pressure whereas the heat exchange fluid 112 in the container 20 may have low or near atmospheric pressure and thus does not exert any pressure onto the solid state materials. In a typical case of the configuration shown in FIGS. 2 and 3 the working fluid used in the primary loop as well as for heat transfer fluid in the heat exchanger will be thermal oil; however, other types of working fluids may also be considered. An even simpler alternative of FIG. 4, which can be used when the working fluid 111 is the same as the heat exchanger fluid 112, is to replace the heat transfer fluid 112 with solid state heat storage material 121. What was prior the heat exchange container 120 now becomes a cylindrical, or any other suitable geometry such as superelliptic, rectangular etc, casting form which subsequently also acts as an outer reinforcement shell. This alternative can have one or more pairs of vertical heat transfer containers 101 connected at the bottom in which the working fluid/heat transfer fluid 111 flows. In this configuration heat is delivered to and from the solid state storage media largely by convection. This version of FIG. 4 is shown in FIG. 13 and FIG. 14, for the special case of having two pairs of vertical heat exchangers. Another simple design is shown in FIG. 5. This version of heat exchanger can be used when the working fluid 111 is the same as the heat exchanger fluid 112. As seen from the figure the working fluid is led through a pipe into the heat exchange container and delivers heat largely by convection before being pressed out with a lower temperature. In the heat extraction mode cold working fluid is pressed into the container where it absorbs heat and comes out with a higher temperature.

FIGS. 4 and 5 illustrate basic principles for types of heat exchangers that may be used. In a real size storage there may be very large number of heat exchangers coupled by means of pipes and valves. The flow through these heat exchangers may be by way of serial as well as parallel coupling.

FIG. 6 shows a system flow diagram for another type of plant implementation of the current invention. In this case one type of working fluid is used in the primary heating loop whereas another fluid is used in the heat delivery loop. For instance, the heat source may be heating one type of fluid that is pumped through pipe 21 into heat exchanger pipe 102 for heat delivery to the storage 100 and via pump 65 back into the heating source for re-heating. Thermal oils may be a typical type of working fluid here. The same figure also illustrates the heat extraction mode a different type of working fluid is used for transporting heat out of the storage. Note that the heat extraction operation makes use of the same heat exchangers as for the heat storage.

FIG. 6 further illustrates an alternative application of the invention where the working fluid for the heat extraction, on the delivery side, is water-steam. The advantage by this is that the heat delivered can be used directly to run steam turbines and electric generators. Water-steam is heated in the pipes 103 within the heat exchangers of the storage and goes via pipe 23 into turbine 81 after which it goes through pipe 18 into a cooling system 43 and via pipe 24 and pump 62 back into the storage for re-heating. The figure indicates a cooling tower 82 as cooling system whereas other ways of cooling can also be used. There may also be other pipes, valves and pumps not shown in the figure.

FIG. 7 shows in principle one type of heat exchanger that may be used within the storage in connection with the application illustrated in FIG. 6. The working fluid 113 of the primary heating loop goes through pipe 103 which is submerged in the heat transfer fluid 112 within the heat exchanger container 120. This container is in direct contact with the solid state heat storage material 121 consisting of one or several zones of different materials. The heat extraction makes use of fluid 114, which is typically water-steam, via pipe 102, into the heat utilization loop.

FIG. 8 shows a somewhat different and simplified version of heat exchangers used in the storage. In this case the working fluid in the heating loop 113, fed through pipe 104, is the same as the heat transfer fluid in the heat exchanger container.

It should be clear that the storage as illustrated in FIG. 6 not only functions as heat storage; it is also a heat exchanger between two different types of working fluids where the working fluid used in the heat extraction is used directly to run electricity generating steam turbines.

Considering a power plant as in FIG. 6 with two different types of working fluids it will be further understood that there is always need for a heat exchanger between the heated fluid used in the heat absorber 2 and the steam used in the turbines. In case the storage is fully bypassed without delivering heat to the storage such heat exchanger and boiler system must be provided as a separate unit on the outside of the storage (not shown in FIG. 6). However, the invention provides an alternative to having an external, separate heat exchanger between the two fluids since the plant comprise heat storage with heat exchanger in itself. The objective of delivering heat generated in the primary loop directly to the turbines can in fact be achieved by running the two loops shown in FIG. 6 simultaneously. The design of the heat exchangers illustrated in FIGS. 7 and 8 is such that when the two fluids 113 and 114 are circulated at the same time most of the heat transfer goes directly between the two fluids rather than into the storage materials 121 via the container 120. Some heat will necessarily be leaked from the heat transfer fluid into the storage during the targeted heat exchange operation; however, this heat leakage does not constitute any real energy loss. In fact the heat transfer to the storage may be planned as "partial storage mode" for the overall operation. The actual and relative velocities of the fluid flows decides how much heat is directly transferred and how much is stored.

FIGS. 9 and 10 illustrate yet another application of the invention. In this case the working fluid of heat source is directly water-steam. The figure indicates a CSP plant where water is heated to steam at very high temperature and pressure in the solar receiver. The source of heating may also be of other type such as a fossil fuel power, nuclear or geothermal power plant, replacing or in addition to the tower. In the heat storage mode shown in FIG. 9 steam is brought from the source 2 via pipe 25, valve 43 and pipe 26 into the pipe loop 101 of the storage. After this the fluid is pumped by way of pump 66, pipe 27, valve 44 and pipe 28 back into the source 2 for re-heating.

Prior art plants using water-steam as the only energy transport medium, can not store the high temperature heat in a practical way, since storage is impractical due to excessive number of thick walled steam pressure tanks and very high related cost. If the steam condenses, the steam is lost. With the solution of the invention, storage without practical size limits, large dynamic differential temperature ranges, higher maximum and lower minimum temperature, out of phase with source delivery, and increased maximum production level by combining delivery from storage and source, can easily be achieved.

FIG. 10 shows the situation for heat extraction operation. Steam is heated in pipe 101 within the heat exchangers in the storage and goes through pipe 26, valve 43, and pipe 29 into the electricity generating turbine 81. After this the fluid goes via pipe 18 into cooling system 43 and is pumped via pump 62, pipe 19, valve 44 and pipe 28 back into the storage.

It is to be noted that the pipe arrangement within the storage may be arranged in different ways to serve a multiple of storage elements; the fluid flow may be organized in serial as well as parallel arrangements. The overall piping system may be adapted to running turbines directly from heating source 2 in parallel with tapping heat from the storage 100. Although this parallel mode of operation is not shown in FIGS. 9 and 10 it may be understood that fluid flow from pipe 25 may be combined with fluid flow from pipe 26 to provide sufficient fluid and heat for the turbines, thereby increasing maximum production. Note that the storage can have a multiple of ways of sending the working fluid through it.

An important consideration may be that the working fluid or heat exchanger fluid will solidify if its temperature falls below the melting point. This situation is particularly applicable to heat transfer fluids suitable for operation at very high temperatures. One way of dealing with this is to operate the system in such a way that the temperature in fluid 112 will never fall below the solidification temperature of the heat exchanger fluid. Another approach is to allow transition from liquid to solid to happen. Such transition may not necessarily imply damage to the system provided that excess thermal expansion does not take place during solidification. Unlike water, most fluids contract during solidification. In fact, phase transition may represent added heat storage capability in that transition from solid to liquid in the heating phase requires extra (stored) heat, which will be given back to the working fluid in the heat extraction mode.

In cases where molten salt or other fluids with relatively high melting points are used as working fluids or as heat transfer fluids in the heat exchangers in the storage problems associated with possible solidification and clogging of pipes may be dealt with in another way. As described in the above mentioned patent applications, electric heating elements may easily be built into the heat exchangers. These heating elements may be put into effect by using electricity when needed.

Figures 11, 12:
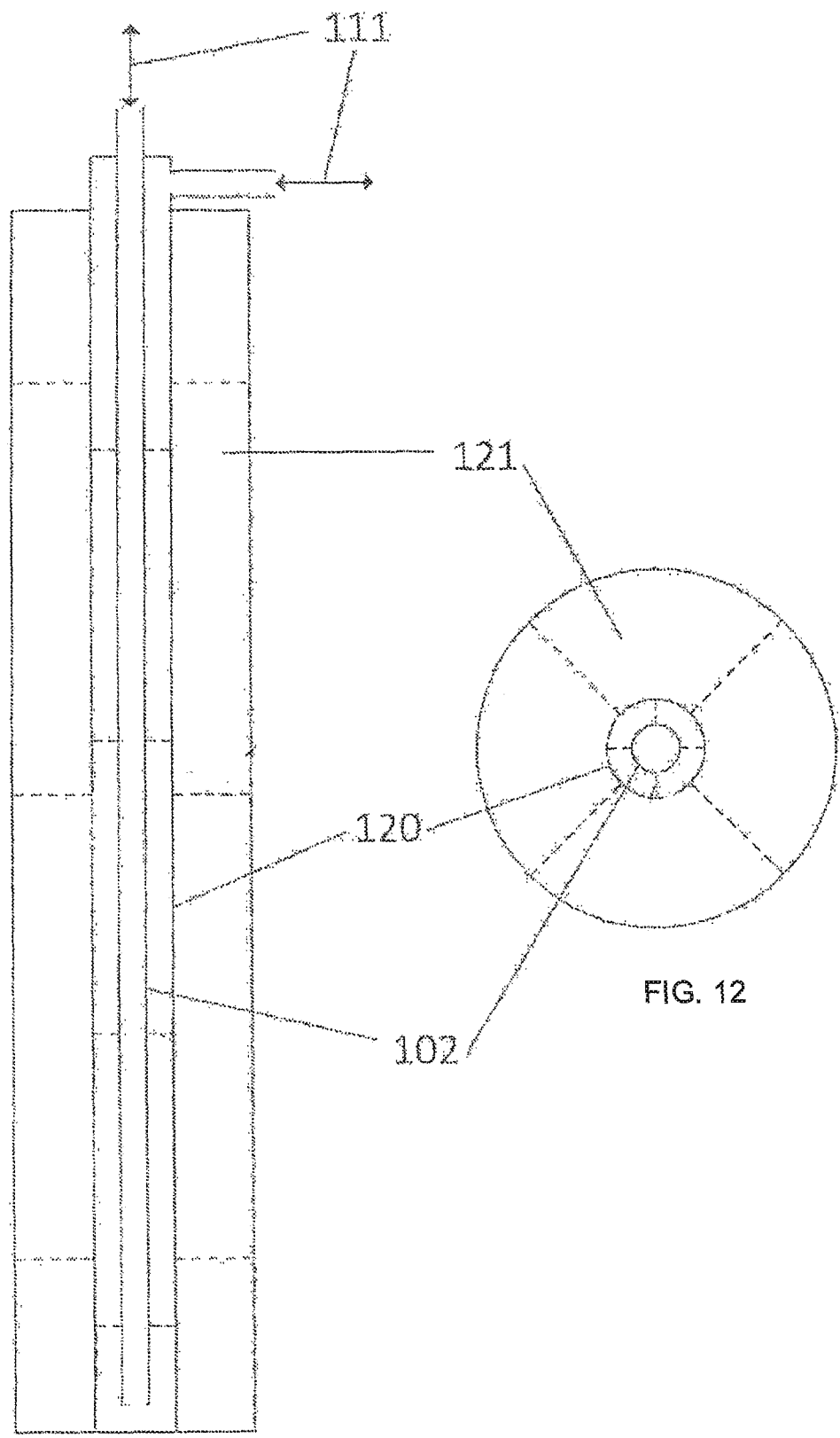

Further reference is made to FIGS. 11-14 illustrating embodiments of the previously mentioned pipe in pipe solution, for which the at least one heat transfer container is the inner pipe and the volume between the heat transfer container, sometimes termed heat pipe, has been filled with concrete. FIGS. 11 and 12 illustrate a basic unit or a basic heat cell, in longitudinal section and cross section, respectively. The inner and outer pipes can be seen clearly, concrete has been arranged in the volume between said pipes. The inner pipe is the heat transfer container. The means for heat input and output inside the heat transfer container can be arranged in many ways also for the so called pipe in pipe solution, as described above and illustrated for other embodiments. In some preferred embodiments the heat transfer fluid and the means for heat input and output is the same fluid. FIGS. 13 and 14 illustrate a so called double U embodiment of the pipe in pipe solution, in longitudinal section and cross section, respectively. For clarity, the internal parts of the heat transfer containers have not been illustrated in said figures.

Storage utilizations beyond what has been described here will also be feasible; it is not possible to describe all possible situations. However, such applications will typically be variations on what has been described herein and may also include additions to the current invention. Also, turbines can be replaced by any kind of heat engine such as Brayton cycles, organic Rankine cycles, Kalina cycles, Stirling engine or other feasible machines for electricity production. Turbines can also be replaced with a pure heat demand, such as process heat for various industrial processes, or combinations of both.

The current invention may also be adapted and utilized in a hybridized power plant. Examples of this are CSP combined with natural gas, coal and biomass. Other combinations are also possible. The case of a hybrid power plant must be considered a variation of what has already been described. Accordingly, the plant of the invention can include any features or steps as here described or illustrated, in any operative combination, each such combination is an embodiment of the invention.

The invention claimed is:

1. A plant for production of energy from an energy source, the plant comprising:
    a thermal energy storage comprising an integrated heat exchanger;
    a heat transfer fluid;
    a heat exchanger comprising an energy input and output;
    wherein the thermal energy storage comprises at least one heat transfer container;
    wherein a concrete solid state thermal storage material is arranged around the at least one heat transfer container;
    wherein the at least one heat transfer container contains the heat transfer fluid and the heat exchanger, wherein heat transferring via convection and conduction by the heat transfer fluid takes place within the at least one heat transfer container;
    wherein the thermal energy storage with the heat exchanger has been arranged inside thermal insulation; and
    wherein the thermal energy storage with the heat exchanger has been arranged between an input side and a delivery side of the plant for storage and heat exchange of thermal energy; and
    wherein the thermal energy storage is coupled directly or via an additional heat exchanger to the energy source and the thermal energy storage is coupled directly or via an additional heat exchanger to the delivery side of the plant.

2. The plant according to claim 1, wherein:
    the plant is a concentrated solar power (CSP) plant with molten salt or oil on the input side; and
    the thermal energy storage is coupled directly to the delivery side by a steam or water or supercritical water filled pipe circuit or indirectly via the heat exchanger and the molten salt or oil thereby eliminating a molten salt storage system.

3. The plant according to claim 1, wherein:
    the plant is a concentrated solar power (CSP) plant with steam or supercritical water on the input side; and
    the thermal energy storage is coupled directly to the delivery side by a steam or water or supercritical water filled pipe circuit and a pipe coupling is arranged for connecting the input side and the delivery side of the plant thereby providing stable production over time and higher efficiency by larger dynamic temperature range in periods of low or no heat from the input side of the plant by operating the storage for delivering thermal energy at high dynamic range and high temperature.

4. The plant according to claim 1, wherein:
    the plant is a nuclear power plant with at least one of molten salt, molten metal, and carbon dioxide; and
    the thermal energy storage is coupled directly to the delivery side by a steam or water or supercritical water filled pipe circuit or indirectly via the heat exchanger and at least one of the molten salt, molten metal, and carbon dioxide thereby eliminating less efficient alternative storages and allowing higher dynamic temperature range in the plant and improved safety by using non-volatile solid state thermal energy storage.

5. The plant according to claim 1, wherein an input side fluid temperature of the plant is in a range of approximately 100-1000° C. and an output side fluid temperature of the plant is in a range of approximately 100-1000° C.

6. The plant according to claim 1, wherein the energy source comprises at least one of solar power sources, nuclear reactors, fossil fuel plants, wind power plants, tidal power plants, waste heat power plants and geothermal sources.

* * * * *